(12) United States Patent
Kapuram et al.

(10) Patent No.: US 8,229,953 B2
(45) Date of Patent: Jul. 24, 2012

(54) METRIC CORRELATION AND ANALYSIS

(75) Inventors: Venkata Ramana Kapuram, Sunnyvale, CA (US); Rajiv K. Maheshwari, Saratoga, CA (US); Richard Sarwal, Portola Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 197 days.

(21) Appl. No.: 12/731,743

(22) Filed: Mar. 25, 2010

(65) Prior Publication Data

US 2011/0238687 A1 Sep. 29, 2011

(51) Int. Cl.
*G06F 17/30* (2006.01)
*G06F 3/048* (2006.01)
(52) U.S. Cl. ........................ 707/769; 715/764
(58) Field of Classification Search .................. 707/769, 707/758; 717/120; 711/162; 715/771, 715, 715/764; 703/21; 709/221
See application file for complete search history.

(56) References Cited

U.S. PATENT DOCUMENTS

| | | | |
|---|---|---|---|
| 7,222,121 B2 | 5/2007 | Casati et al. | |
| 8,006,230 B2* | 8/2011 | Agarwal et al. | 717/120 |
| 2005/0076113 A1* | 4/2005 | Klotz et al. | 709/224 |
| 2006/0053261 A1* | 3/2006 | Prahlad et al. | 711/162 |
| 2006/0167704 A1* | 7/2006 | Nicholls et al. | 705/1 |
| 2008/0189717 A1* | 8/2008 | Agarwal et al. | 718/106 |
| 2008/0216098 A1* | 9/2008 | Agarwal et al. | 719/328 |
| 2008/0294418 A1* | 11/2008 | Cleary et al. | 703/21 |
| 2010/0036810 A1 | 2/2010 | Wu et al. | |
| 2011/0012902 A1* | 1/2011 | Rajagopalan et al. | 345/440 |

OTHER PUBLICATIONS

Oracle Corporation, "Oracle® Enterprise Manager, Concepts," 10g Release 5 (10.2.0.5), B31949-10, Mar. 2009, 266 pages.

* cited by examiner

*Primary Examiner* — Hung T Vy
(74) *Attorney, Agent, or Firm* — Hickman Palermo Truong Becker Bingham Wong LLP; Adam C. Stone

(57) ABSTRACT

Techniques for improved metric correlation and analysis include, during a modeling phase, a user familiar with the types of system components deployed in an enterprise network and the metrics available for those types of system components specifying dependencies between metrics in a metric dependency model. During a binding phase, the metric dependency model is provided to a modified enterprise management (MEM) system which binds the model to particular enterprise system environment. During a metric correlation and analysis phase, the MEM system provides a user-interface through which a user visually compares metric data for metrics collected from system components deployed in an enterprise system environment bound to the model. The improved metric correlation analysis techniques allow users to more easily identify whether degradation in the performance of one metric is caused by performance degradation of underlying information technology system components as measured by related metrics specified in the metric dependency model.

48 Claims, 12 Drawing Sheets

METRIC CORRELATION AND ANALYSIS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to enterprise management systems and, more particularly, to techniques for improved metric correlation and analysis.

BACKGROUND

Enterprise management systems (EM systems) are being used to centrally manage heterogeneous devices and applications deployed in enterprise networks. FIG. 1 illustrates the basic architecture of an EM system 10. At a high level, the system 10 includes a management server 12a connected over a network to various managed devices 11 on which various software applications are deployed. More specifically, the system includes one or more managed devices 11 connected over a network to least one server 12a for managing devices 11. Management agents installed and executing on the managed devices 11 perform monitoring of the managed devices. The agents collect monitoring data which is provided to management server 12a for aggregation. Management server 12a stores monitoring data collected from the managed devices 11 in management repository 12b. Management server 12a also provides a user-interface for viewing data in the management repository 12b to enable a system administrator to check the status of managed devices 11. In addition, the management server 12a communicates with agents on the managed devices 11 for the purpose of affecting changes in configuration of software applications installed and executing on devices 11. Such changes are initiated by the system administrator through the user-interface of management server 12a.

EM systems may provide the ability for a system administrator to view many individual metrics for various hardware and software system components deployed in an enterprise network. For example, a typical EM system provides the ability for a system administrator to determine the utilization of a central processing unit (CPU) of a particular managed device. As another example, a typical enterprise management system provides the ability to determine the average amount of time taken by a particular software application to authenticate users logging on to the application.

In addition to providing the ability to view metrics, EM systems may provide the ability to generate alerts when a metric exceeds or falls below a pre-defined threshold. For example, an EM system may generate an alert in the form an electronic message (e-mail) or offline report to a system administrator when the amount of available non-volatile storage space on a particular managed device falls below a pre-defined amount. Thus, EM systems may provide low-level monitoring and management capabilities geared toward system administrators. These systems allow administrators to manage and monitor the information technology infrastructure of an enterprise at the level of individual system components. For example, if the system administrator receives an alert that available non-volatile storage space on a particular managed device is running low, the administrator can take appropriate remedial action such as replacing the storage device with a larger capacity storage device or removing unwanted data from the existing storage device to free up available storage space.

While some EM systems are useful for troubleshooting individual system components in an enterprise network, such systems provide limited to no ability to determine how the performance of any individual system component is related to or dependent on the performance of other system components. More generally, such systems provided limited to no ability to determine how the performance of a key organizational process of the enterprise is related to or dependent on the performance of individual system components in the enterprise network. For example, in response to receiving an alert that a particular storage device is running out of available storage space, some EM systems do not provide an integrated way for the system administrator to determine what deployed software applications depend on the particular storage device. If there are mission-critical software applications that depend on the particular storage device, then it may not be appropriate for the system administrator to remedy the low storage space alert by taking the storage device "off-line" in order to replace the storage device. Instead, another remedy which minimizes the downtime of the dependent software applications is more appropriate. With some EM systems, the system administrator may be required to perform a lengthy investigation to determine what software applications depend on a particular system component before taking any remedial action. This is inefficient for the enterprise.

Another deficiency of some EM systems is that they provide limited to no ability to determine what information technology system components support a particular organizational process. For example, a company that manufactures and sells widgets may use an order processing software application to enter orders for widgets received over the telephone by customer service representatives. The order processing application may provide, for example, an average order processing time metric that measures the average amount of time between initiating entry of a new order and the completing entry of the order. Such a metric may depend on a variety of factors including human resource factors and information technology factors. Often it is a front-line organizational manager, and not a system administrator, that is first to notice when an organizational metric trends or moves in an undesirable direction (e.g., average order processing time suddenly increases). However, some EM systems provide limited to no ability to determine what system components in the enterprise network support the organizational process. Thus, with some EM systems, the front-line manager cannot easily determine whether the undesirable trend in the organizational metric is caused by a problem with system components on which the organizational process depends. For example, the increase in average order processing time may be caused by the order database being overloaded with order entry requests. With some EM systems, the front-line manager may be required, perhaps in cooperation with information technology specialists, to perform an extensive investigation to determine which system components support the organizational process and whether those system components are the cause of the degradation in the organizational metric. This is undesirable not only because it is time-consuming, but also because the front-line manager may not be able to diagnose the problem herself and instead, may require the help of typically over-burdened information technology system administrators.

Given the ever-increasing reliance by organizations on information technology to support their organizational processes, there is much interest in improving the visibility of organizational dependencies on information technology system components deployed in enterprise networks. Accordingly, there is a need for an enterprise management system that provides improved visibility of the relationships between system components deployed in enterprise networks and that provides improved visibility of the relationships between organizational metrics and system components. Embodiments of the present invention fulfill these and other needs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5B is a screen shot of a user interface for analyzing metric data obtained from system components in the enterprise environment of FIG. 5A.

FIG. 7B is a screen shot of a user interface for analyzing metric data obtained from system components in the enterprise environment of FIG. 7A.

FIG. 8 is a screen shot of a user interface for searching for configuration changes made to system components of managed hosts in an enterprise environment.

DETAILED DESCRIPTION

Figure 9:
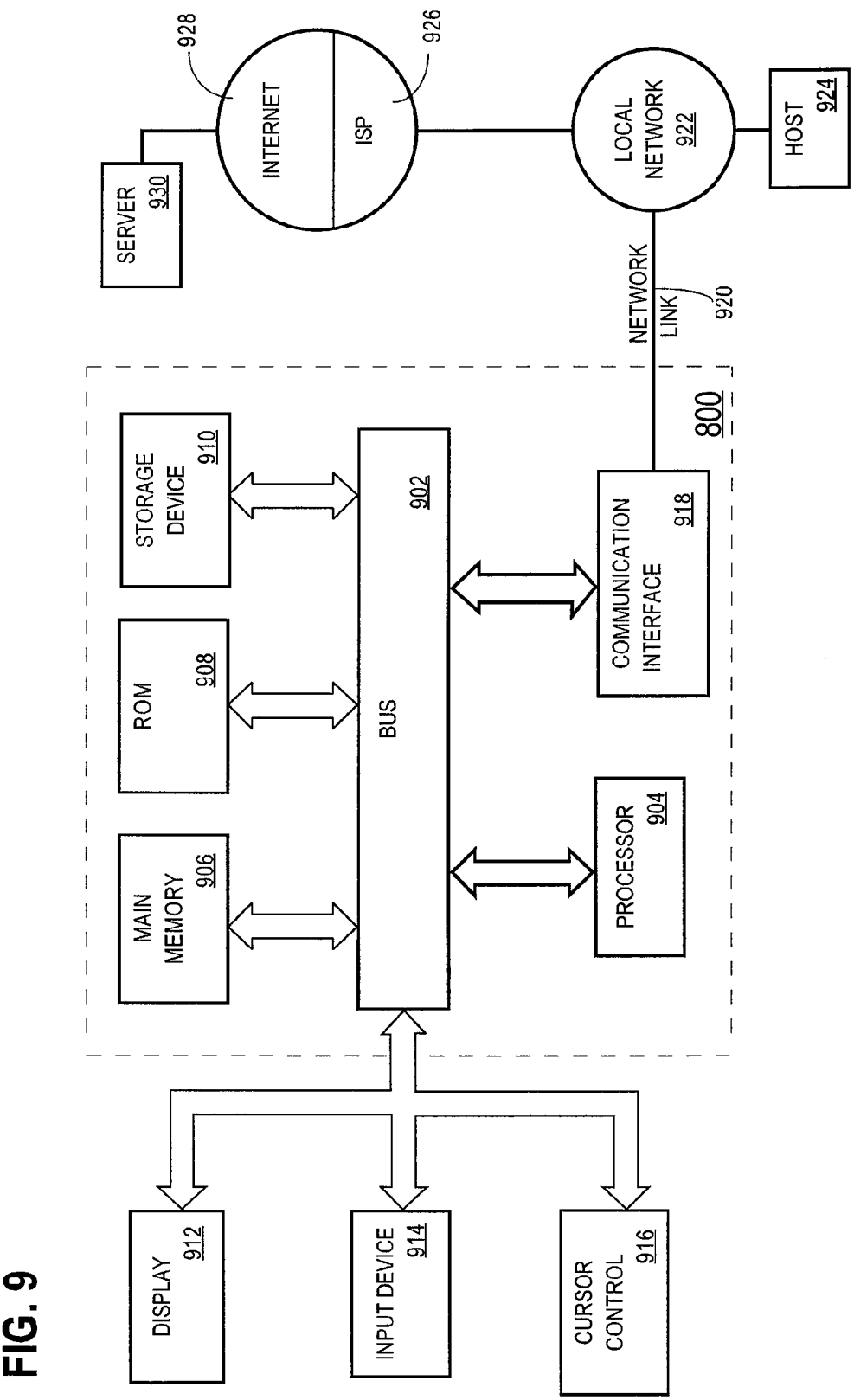
FIG. 9 is a block diagram that illustrates a computer system upon which an embodiment of the invention may be implemented.

The following description will focus on an exemplary embodiment of the present invention, which is implemented in software operating in a network-connected environment running under an operating system, such as Microsoft® Windows NT running on a computer system such as system 900 of FIG. 9. However, the present invention is not limited to any particular application or any particular environment. Instead, those skilled in the art will find that the system and methods of the present invention may be advantageously embodied on a variety of different platforms, including Mac OS, Linux, Solaris, Unix, etc. Additionally, in the following description, for the purposes of explanation, numerous specific details are set forth in order to provide a thorough understanding of the present invention. It will be apparent, however, to one skilled in the art that the system and methods of the present invention may be practiced without these specific details. In other instances, well-known structures and devices are shown in block diagram form in order to avoid unnecessarily obscuring the present invention. Thus, the description of exemplary embodiments that follows should be regarded in an illustrative sense and not a restrictive sense.

Exemplary embodiments are described herein according to the following outline:
  1.0 General Overview of Improved Metric Correlation and Analysis
  2.0 Exemplary Operating Environment for Modified Enterprise Management System
    2.1 Managed Hosts
    2.2 System Component Data
    2.3 Metric Dependency Model
      2.3.1 No Nesting Metric Dependency
      2.3.2 One-Level Nesting Metric Dependency
      2.3.3 One-Level Nesting Metric Dependency Through Associations
      2.3.4 Multi-Level Nesting Metric Dependency Through Associations
      2.3.5 System Component Clusters
      2.3.6 Configuration Metrics
      2.3.7 Searching for Configuration Changes
  3.0 Implementing Mechanisms—Hardware Overview
  4.0 Extensions and Alternatives 1.0 General Overview of Improved Metric Correlation and Analysis In accordance with an embodiment of the present invention, operation of an enterprise management system is modified to provide improved metric correlation and analysis. A user of the modified enterprise management system (MEM system) conceptually views the metric correlation and analysis process as three phases: a modeling phase, a binding phase, and an analysis phase.

During the modeling phase, a user familiar with the types of system components deployed in an enterprise network and the metrics available for those types of system components specifies dependencies between metrics in a metric dependency model. The term "system component" shall be used hereafter to refer generally to any computing device, any hardware component, any software component, or any cluster of devices, hardware components, or software components, deployed in an enterprise network. Non-limiting examples of types of hardware system components deployed include workstation, server, and desktop computer systems and the types of hardware components that comprise those computer systems such as CPU devices, memory devices, storage devices, peripherals, and the like. Non-limiting examples of types of software components include web server applications, database applications, order processing applications, enterprise resource planning (ERP) applications, financial applications, and any other type of software applications that support the operation of the enterprise. Non-limiting examples of types of clusters deployed in an enterprise network include web server clusters, database clusters, software application clusters, storage clusters, load balancing clusters, etc.

During the modeling phase, the user specifies in the metric dependency model a source metric and one or more related metrics on which the source metric depends. Typically, the source metric will be a high-level organizational metric that measures a fundamental organizational process of the enterprise and the one or more related metrics will be relatively lower-level metrics that measure the health, usage, or performance of system components that support the organizational process. Since the metric dependency model allows the user to flexibly model a dependency between any available metric and any other available metric, knowledge within an organization about the dependencies between organizational processes and supporting system components that were previously only captured informally or residing only in the minds of organizational personnel can now be captured formally in a form understandable by a computer. In one embodiment, the metric dependency model is represented in a form understandable by a computer as an eXtensible Markup Language (XML) document. As described in greater detail herein, the MEM system uses the metric dependency model to provide greater visibility into the relationship (correlation) between a change in trend or tendency of an organizational metric and the health, usage, and performance of the system components on which the organizational process measured by the organizational metric depends.

In addition to specifying dependencies between metrics in the metric dependency model, the user also specifies types of system components for which the source metrics and the one or more related metrics are available and, optionally, deployment relationships between instances of the types of system components. Non-limiting examples of a "deployment relationship" include "deployed on", "runs on", "connects", and "uses" as in, for example, a financial software application is "deployed on" a Java 2 Platform, Enterprise Edition (J2EE) container which in turn "runs on" a host. As described in greater detail herein, such information about the types of system components and deployment relationships are used by the MEM system during a binding phase to bind the metric dependency model to a particular enterprise system environment. More specifically, the MEM system identifies instances of the types of system components specified in the model that are related to one another as indicated by the deployment relationships. This binding performed by the MEM system allows metric dependencies to be modeled more generically, in terms of types of system components and deployment relationships, without reference to a particular enterprise environment or particular system component instances. For example, if an enterprise has more than one branch office each executing the same organizational process using the same type of database application, only one metric dependency model need be defined. A MEM system is capable of using that single model to bind to each instance of the database application deployed at each branch office.

For the metric correlation and analysis phase, the MEM system provides a user-interface through which a user visually compares metric data collected for the source metric with metric data collected for the one or more related metrics. For example, the system can display a graph for the source metric and the one or more related metrics that charts each metric over the same interval of time. In this way, if a user notices a change in trend or tendency of the source metric (for example, by receiving an alert), the MEM system allows the user to easily determine which system components the source metric depends on and whether there is a correlation between a change in performance of a related system component and the change in trend or tendency of the source metric that is indicative of a cause of the change.

The improved metric correlation analysis capabilities provided by the MEM system allow front-line or high-level managers or other non-technical personnel in an organization to more easily identify whether degradation in the performance of organizational processes is caused by performance degradation of underlying information technology system components without having to perform a lengthy investigation into the cause of the degradation and without having to involve technical personnel within the organization.

Figure 1:
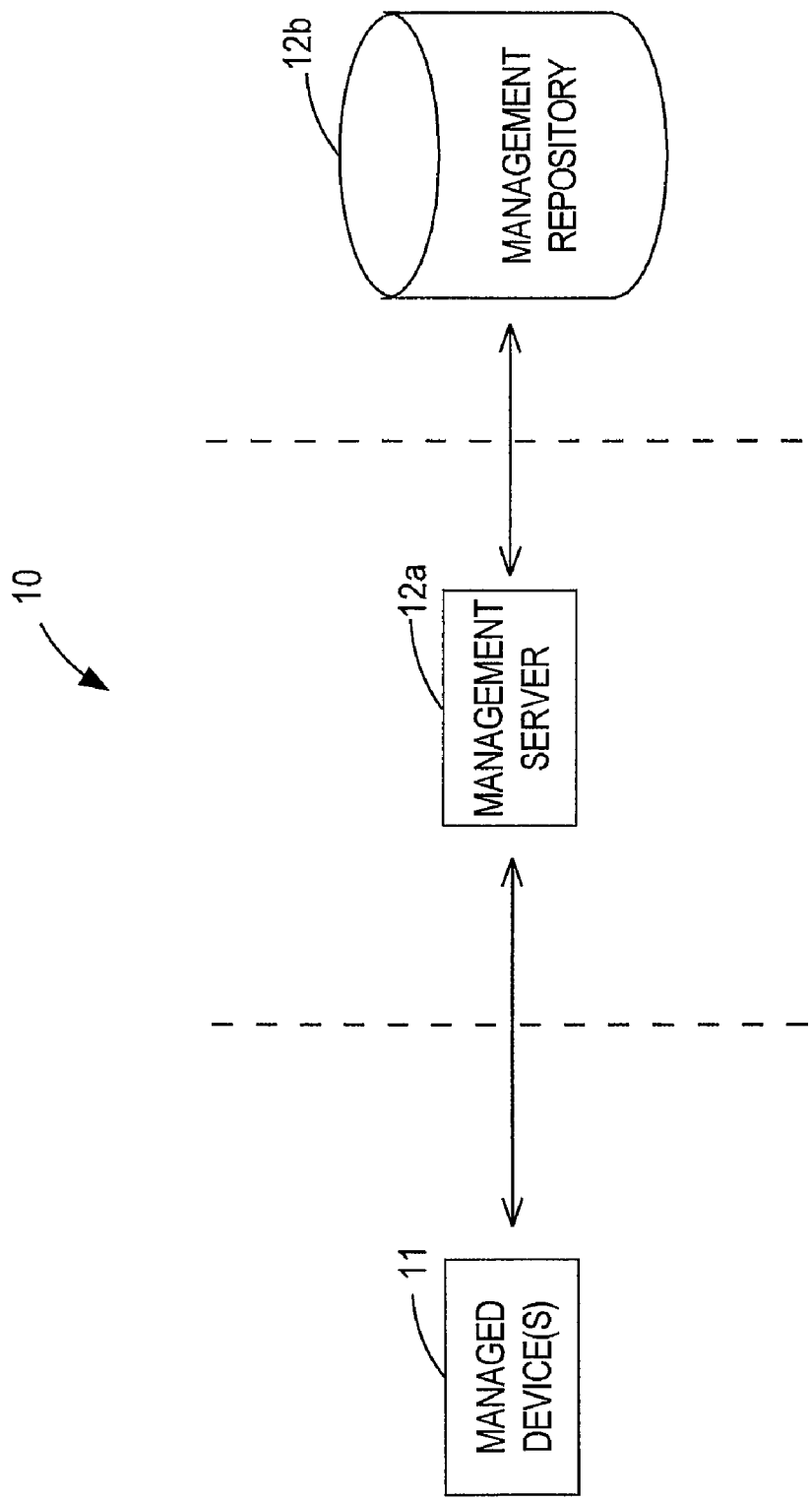
FIG. 1 illustrates the basic architecture of typical enterprise management system.
Figure 2:
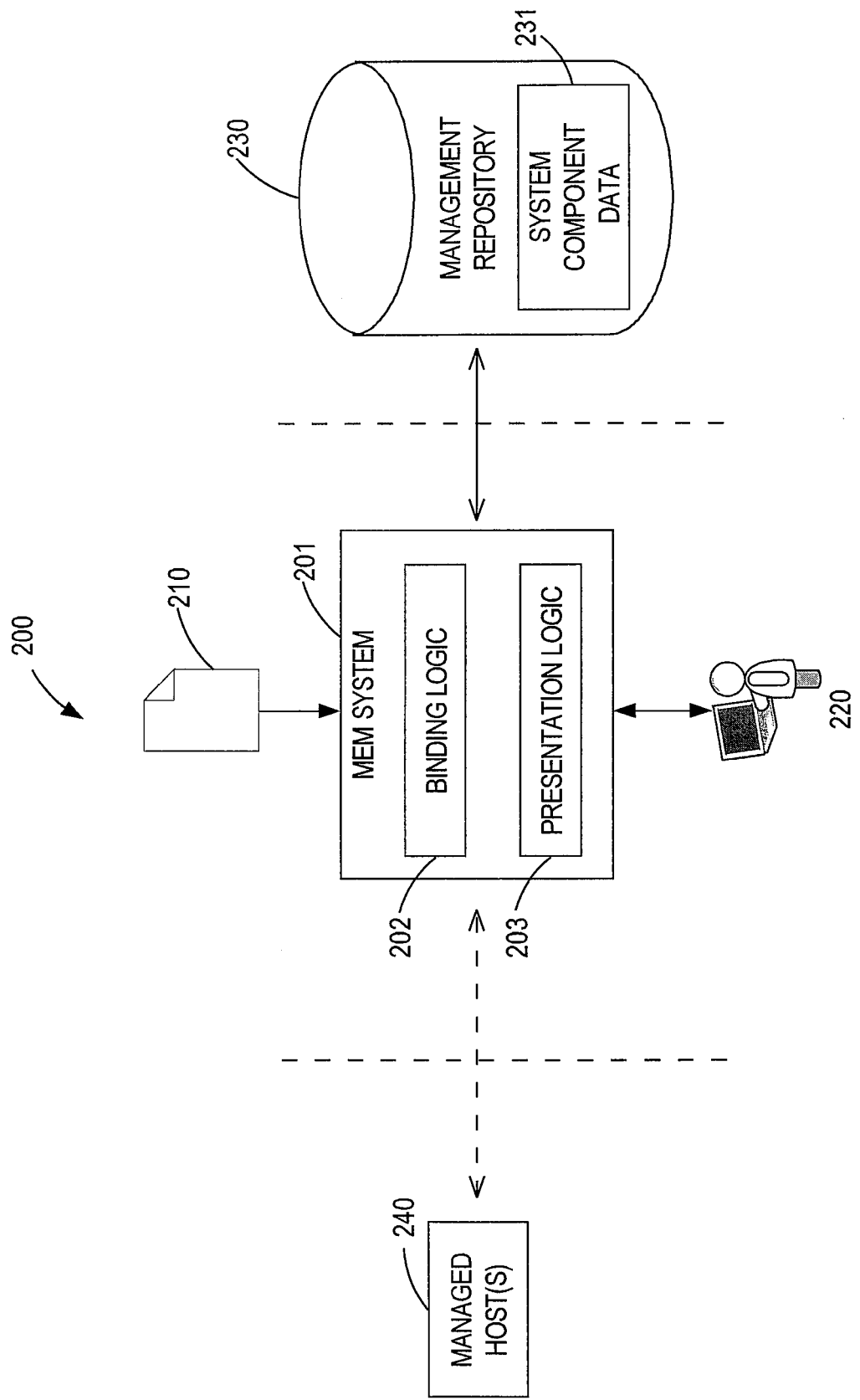
FIG. 2 is a high-level block diagram illustrating an example operating environment that includes a modified enterprise management system (MEM system) for providing improved metric correlation and analysis.

2.0 Exemplary Operating Environment for Improved Metric Correlation and Analysis FIG. 2 is a high-level block diagram illustrating an example operating environment 200 that includes a modified enterprise management system (MEM system) 201 for providing improved metric correlation and analysis according to an embodiment of the invention. At the highest level, a metric dependency model 210 is provided to MEM system 201. In one embodiment, model 210 specifies (1) a source metric, (2) a metric that is deemed by to be related to the source metric (a "related metric"), and (3) a type of system component for which the source metric is available ("source system component type") and a type of system component for which the related metric are available ("related system component type").

Upon receiving the model 210, MEM system 201 searches system component data 231 stored in management repository 230 to identify system component instances that satisfy the metric dependency model 210. This process performed by MEM system 201 is generally referred to herein as "binding" system component instances to the model 210. Once system component instances are bound to model 210, MEM system 201 is capable of providing to a user 220 of MEM system 201 metric correlation and analysis functionality for the bound system component instances. Such functionality includes presenting to user 220 a user interface that allows the user 220 to visually compare metric data for the source metric obtained from a source system component instance with metric data for the related metric(s) obtained from related system component instance(s). By virtue of the metric dependency model 210, the MEM system 201 facilitates problem correlation by flexibly allowing any available metric to be compared with any other available metric, even where such metrics were otherwise previously unrelated. For example, a high-level metric that measures the performance of an organizational process can be compared to a relatively lower-level metric such as utilization of CPUs of the managed devices that support the organizational process. Since knowledge within an organization of dependencies between metrics can be captured in the model 210, the improved metric correlation and analysis techniques describe herein can be used to not only capture such organizational knowledge, but also allows users of MEM system 201 to act on such captured knowledge to troubleshoot and diagnose undesirable trends or tendencies in fundamental organizational metrics.

2.1 Managed Hosts

As shown in FIG. 2, environment 200 comprises one or more managed hosts 240. Managed hosts 240 represent servers, network devices, workstations, virtual machines, etc. deployed in an enterprise network. Such enterprise network can include many sub-networks such one or more Local Area Networks (LANs), Wide Area Networks (WANs), Virtual Private Networks (VPNs), etc. The enterprise network can be distributed geographically across one or more offices, one or more data centers, etc. In one embodiment, managed hosts 240 are connected over the enterprise network to one or more MEM systems 201. However, as will be clear from the description below, managed hosts 240 need not be connected via a network to a MEM system 201 in order for MEM system 201 to provide metric correlation and analysis functionality.

Conceptually, each managed host 240 (which is a system component instance itself) comprises a plurality of hardware and software system components. Generally, hardware system components of a managed host 240 include CPU devices, memory devices, storage devices, network devices, I/O devices, etc. However, in some cases where managed host 240 is a virtual machine, hardware system components of a managed host 240 can include virtual CPU devices, virtual memory devices, virtual storage devices, virtual network devices, virtual I/O devices, etc. provided by the virtual machine. Generally, software system components of a managed host 240 include any software executing or installed on the managed host 240.

Figure 3:
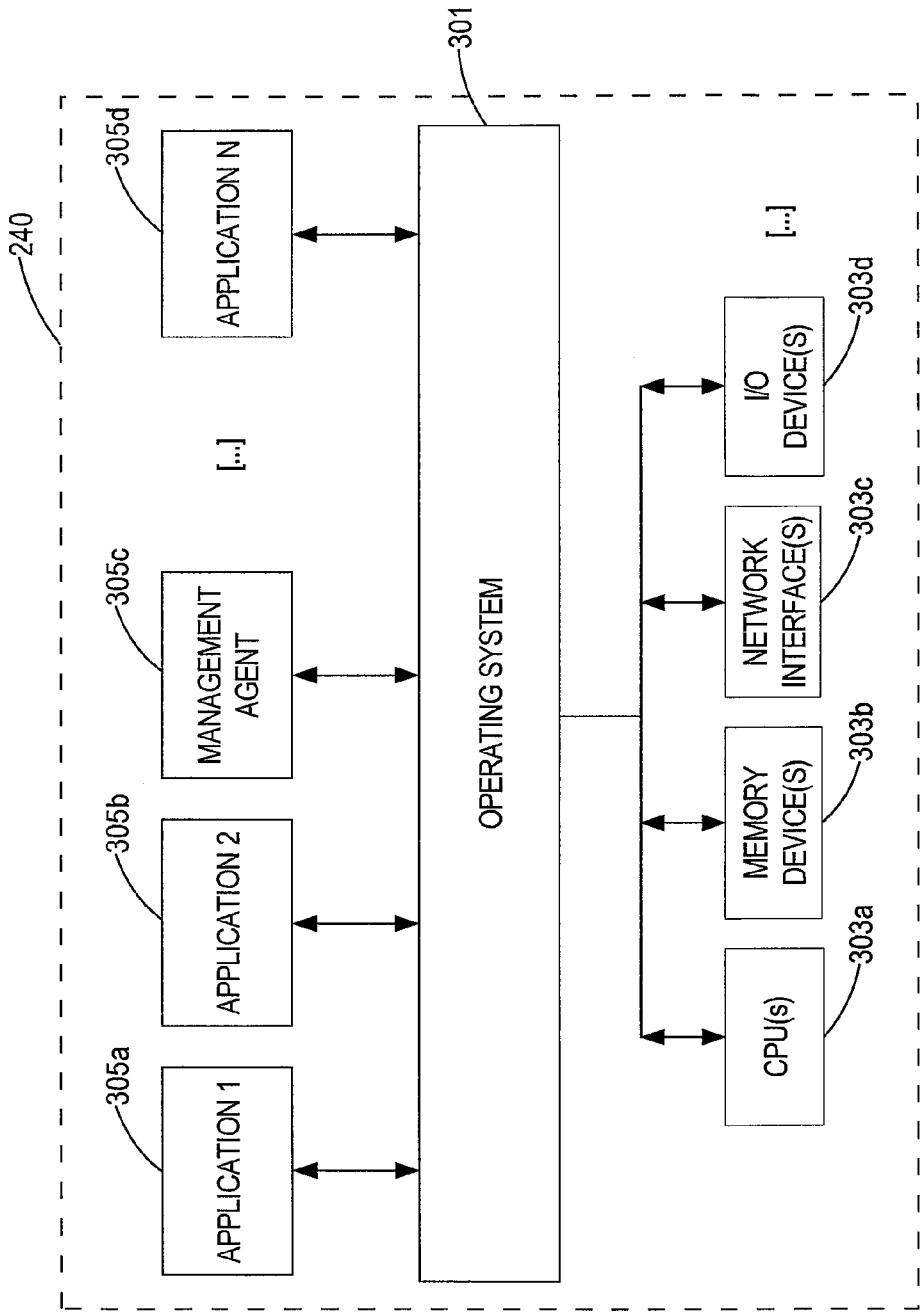
FIG. 3 is a block diagram of a computer software system for directing the operation of a managed host of FIG. 2.

FIG. 3 is a block diagram of a computer software system 300 for directing the operation of a managed host 240 of FIG. 2 according to an embodiment of the invention. Software system 300 includes a kernel or operating system (OS) 301. The OS 301 manages low-level aspects of computer operation, including managing execution of processes, memory allocation, file input and output (I/O), device I/O, etc. The OS 301 can be provided by a conventional operating system, such as the Microsoft® Windows NT family of operating systems available from the Microsoft Corporation of Redmond, Wash. Alternatively, OS 301 can also be an alternative operating system, such as Linux OS available from several vendors, including from Red Hat, Inc. of Durham, N.C.

One or more software applications (software system components) 305 can execute on host 240 in cooperation with OS 301 to perform various software application tasks. For instance, when host 240 is a server computer system, software system component 305 includes server applications such as database servers, web servers, enterprise resource planning applications, application servers, and the like. When host 240 is a client computer system, on the other hand, software system component 305 includes client applications such as browser applications, word processing applications, client e-mail software applications, and the like.

In one embodiment, system component data 231 stored in management repository 230 is based on data provided to MEM system 201 by management agents installed and executing on managed hosts 240. Whether host 240 is a server computer system or a client computer system deployed in an enterprise, one of the software system components 305 installed and executing on host 240 can include a management agent (shown in FIG. 3 as software system component 305c). Agent 305c is a software service that executes on host 240 performing various management agent tasks. In particular, agent 305c primarily performs two tasks that are not exclusive of other tasks agent 305c might perform.

First, agent 305c discovers software and hardware system components 303 and 305 that comprise host 240 and the configuration of those components and periodically reports inventory and configuration information to MEM System 201 to be stored as part of system component data 231 in management repository 230. Any number of a variety of techniques can be used by management agent 305c to determine hardware system components 303 and software system components 305 that comprise a host 240 and embodiments of the invention are not limited to any particular technique. For instance, agent 305c can obtain inventory data and configuration data using an interface provided to it by operating system 301 that hosts the management agent 305c. The interface can take the form of an application programming interface (API) or a command-line interface (shell), or other type of interface provided by operating system 301. For example, the management agent 305c can examine its host 240's file system for the presence of tell-tale files that indicate that a particular software application 305 is installed. Further, the techniques employed can vary depending on the type of operating system 301 that hosts the management agent 305c.

Second, agent 305c collects metric data related to the health, usage, and performance of hardware and software system components 303 and 305 and periodically provides collected metric data to MEM system 201 to be stored as part of system component data 231 in management repository 230. As with inventory and configuration information, any number of a variety of techniques can be used by management agent 305c to collect metric data for hardware components 303 and software system components 305 that comprise a host 240 and embodiments of the invention are not limited to any particular technique.

In one embodiment, Agent 305c communicates with MEM system 201 to report inventory, configuration and metric data using the Hyper Text Transfer Protocol (HTTP) or the Secure Hyper Text Transfer Protocol (HTTPS). However, communication between agent 305c and MEM system 201 is not limited to HTTP or HTTPS and other suitable protocols can be used such as, for example, the Simple Network Management Protocol (SNMP).

2.2 System Component Data

Figure 4:
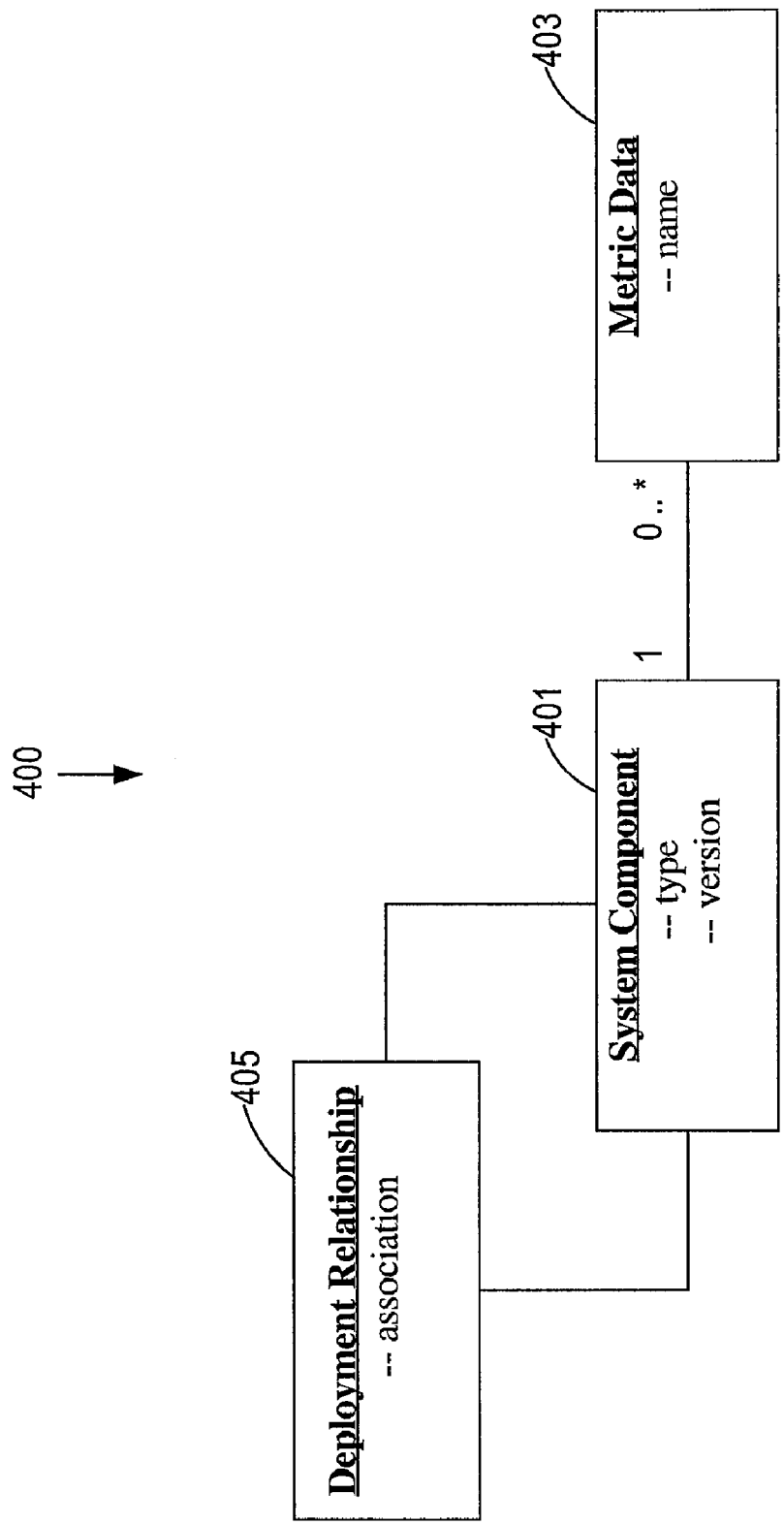
FIG. 4 is a block diagram of a data model for system component data stored in the management repository of FIG. 2.

FIG. 4 is a block diagram of a data model 400 for system component data 231 stored in the management repository 230 of FIG. 2 according to an embodiment of the invention. Conceptually, each box of model 400 represents a different class of data stored as system component data 231. System component data 231 comprises one or more instances of each class of data. Specifically, system component data 231 comprises one or more instances of system component class 401, metric data class 403, and deployment relationship class 405.

Each instance of system component class 401 stored as system component data 231 represents a system component deployed in an enterprise network such as managed hosts 240 and system components 303 and 305 of managed hosts 240. As shown in FIG. 4, each instance of system component class 401 comprises a type attribute. The type attribute of a system component class 401 instance indicates the type of the represented system component. The value of the type attribute can take many forms including, for example, string data indicating the type. For instance, instance of managed host 240 can be designated as type "host". As another example, instances of database applications can be designated as type "database". As mentioned previously and as discussed in greater detail elsewhere in this document, information about the types of deployed system components stored in management repository 230 is used by the MEM system 201 during the binding phase to bind system components deployed in an enterprise network to a metric dependency model 210.

A system component class 401 instance is associated with zero or more instances of metric data class 403 and each metric data class 403 instance is associated with one instance of a system component class 401. Each metric data class 403 instance represents metric data collected for a metric that is available for the system component represented by the associated system component class 401 instance. Each metric data class 403 instance has a name attribute that identifies the available metric by the metric's name.

Generally, a metric is a unit of measurement used to determine the health, usage, or performance of a system component. The metrics available for a particular system component can vary depending on the type of the particular system component. For instance, the metrics available for a "database" type of system component can include "SQL Response Time (ms)" or "Buffer Cache Hit (%)". Metric data for a metric available for a system component can be collected from the system component at regular time intervals. For example, every 15 minutes, once a day, once a week, etc. Accordingly, metric data of a metric data class 403 instance can comprise one or more data samples representing measurements of a property of the system component over a period of time. Each data sample can measure the property using any suitable unit of measurement. For example, each data sample can be expressed as percentage, an average, a median, a scalar value such as time (e.g., milliseconds) or size (e.g., kilobytes), etc.

Also as shown in FIG. 4, a system component class 401 instance can be related to another system component class 401 instance through an instance of a deployment relationship class 405. A deployment relationship class 405 instance represents an association between two system components deployed in an enterprise network. The type of the deployment relationship is indicated by an association attribute of the deployment relationship class 405 instance. Examples of types of deployment relationships include "deployed on", "runs on", "connects", and "uses" as in, for example, an instance of a financial software application is "deployed on" an instance of a Java 2 Platform, Enterprise Edition (J2EE) container which in turn "runs on" a particular host. As mentioned previously and as discussed in greater detail elsewhere in this document, information about deployment relationships between deployed system components is used by the MEM system 201 during the binding phase to bind system components to a metric dependency model 210.

As discussed previously, system component data 231 stored in management repository 230 can be based on data received from management agents installed on managed hosts 240. In addition to or instead of data received from management agents installed on managed hosts 240, system component data 231 can be based on data obtained from other systems such as other monitoring systems or other management systems. Therefore, the basis for system component data 231 is not limited to only data provided by management agents installed hosts 240 as discussed above with respect to FIG. 3.

Data model 400 of FIG. 4 can be implemented using any suitable data modeling technique such as relational data modeling techniques, object-oriented data modeling techniques, hierarchical data modeling techniques, etc. Further, strict adherence to data model 400 is not necessary to practice embodiments of the invention and variations to model 400 can be made within the spirit and scope of the invention.

2.3 Meteric Dependency Model

As mentioned above, the MEM system 201 references a metric dependency model 210 for determining which metrics and system components are to be analyzed. In one embodiment, the model 210 describes administrator-defined metric dependencies, with each dependency being defined by a "source" metric and one or more metrics that are deemed by the administrator to be related to the source metric ("related metrics"). In addition, the source metric is defined by a type of system component for which the source metric is available ("source system component type") and each of the related metrics are defined by a type of a system for which the related metric is available ("related system component type"). Each instance of the source system component type for which the source metric is available is referred to hereinafter as a "source system component instance". Each instance of the related system component type for which the related metric is available is referred to hereinafter as a "related system component instance".

In one embodiment, metric dependency model 210 is provided to MEM system 201 in eXtensible Markup Language (XML) format such as, for example, as an XML document. However, in other embodiments, model 210 can be provided to MEM system 201 in other formats and model 210 is not limited to being formatted as XML. At a high level, when model 210 is formatted as XML, a MetricDependency element identifies, for each unique source metric-related metric pair specified within the metric dependency element, one or more sets of system component instances each comprising a source system component instance and a related system component instance that fits the source metric-related metric pair. More particularly, within each metric dependency element a SourceMetric element is specified. Each metric dependency element has a TargetType attribute that specifies the source system component type. Within each source metric element, one or more RelatedMetric elements are used to specify the metrics that the source metric depends on. If a related metric is available from a related system component instance that is different from the source system component instance, then a related metric element can be nested within an AssocTarget element. Each associated target element has a TargetType attribute that specifies the related system component type. Associated target elements can be nested within other associated target elements to create a chain of dependency relationships between the source system component instance and a related system component instance. The source metric and related metric elements each include a MetricName attribute specifying the name of the metric and a MetricColumn attribute specifying a unit of measurement for displaying metric data for the metric to a user of MEM system 201.

According to one embodiment, a simple metric dependency is defined with the following syntax:

```
<MetricDependency TargetType=system component type>
    <SourceMetric MetricName=metric name MetricColumn=display unit>
        <RelatedMetric MetricName=metric name
        MetricColumn=display unit/>
    </SourceMetric>
</MetricDependency>
```

Any number of metric dependencies can be defined in model 210. According to one embodiment, to specify a metric dependency, model 210 includes one SourceMetric element as a child element of a MetricDependency element and includes one RelatedMetric element as a child element of the SourceMetric element. The TargetType attribute of the metric dependency element is string that is used by MEM system 201 to identify instances of the system component class 401 in system component data 231 by the type attribute of the system component class 401. The MetricName element attribute is a string that is used by MEM system 201 to identify instances of the metric data class 403 in system component data 231 by the name attribute of the metric data class 403. In one embodiment, the MetricColumn element attribute is a string that specifies a unit or a sub-classification for displaying metric data for the associated metric.

According to one embodiment, the supported elements, their permitted attributes, and their permitted child elements are as follows:

| Element | Attributes | Children |
|---|---|---|
| MetricDependency | TargetType | SourceMetric |
| SourceMetric | MetricName | RelatedMetric |
|  | MetricColumn | AssocTarget |
| RelatedMetric | MetricName |  |
|  | MetricColumn |  |
| AssocTarget | TargetType | RelatedMetric |
|  | Association | AssocTarget |

The following example metric dependency definitions, which can be created by a user in a text editor or through an computer-automated process, illustrates the specification of metric dependencies:

2.3.1 No Nesting Meteric Dependency

A simple type of metric dependency is a no nesting metric dependency in which the dependency between the source metric and the related metric(s) are contained within one system component instance. For example, consider the following no nesting metric dependency:

```
<MetricDependency TargetType="fusion_app_financials">
    <SourceMetric MetricName="ReportsProcessing"
    MetricColumn="Time.seconds" >
        <RelatedMetric MetricName="RequestProcessing"
        MetricColumn="Time.milliseconds"
    />
        <RelatedMetric MetricName="DataAccess"
        MetricColumn="Time.seconds" />
    </SourceMetric>
</MetricDependency>
```

The above metric dependency definition specifies that the "ReportsProcessing" metric depends on two related metrics available from the same system component, in particular, the same instance of a "fusion_app_financials" type of system component as indicated by the TargetType attribute of the MetricDependency element. In the above example metric dependency, the target type "fusion_app_financials" refers to financial management software part of a portfolio of software products available from Oracle Corporation of Redwood Shores, Calif.

Figure 5A:
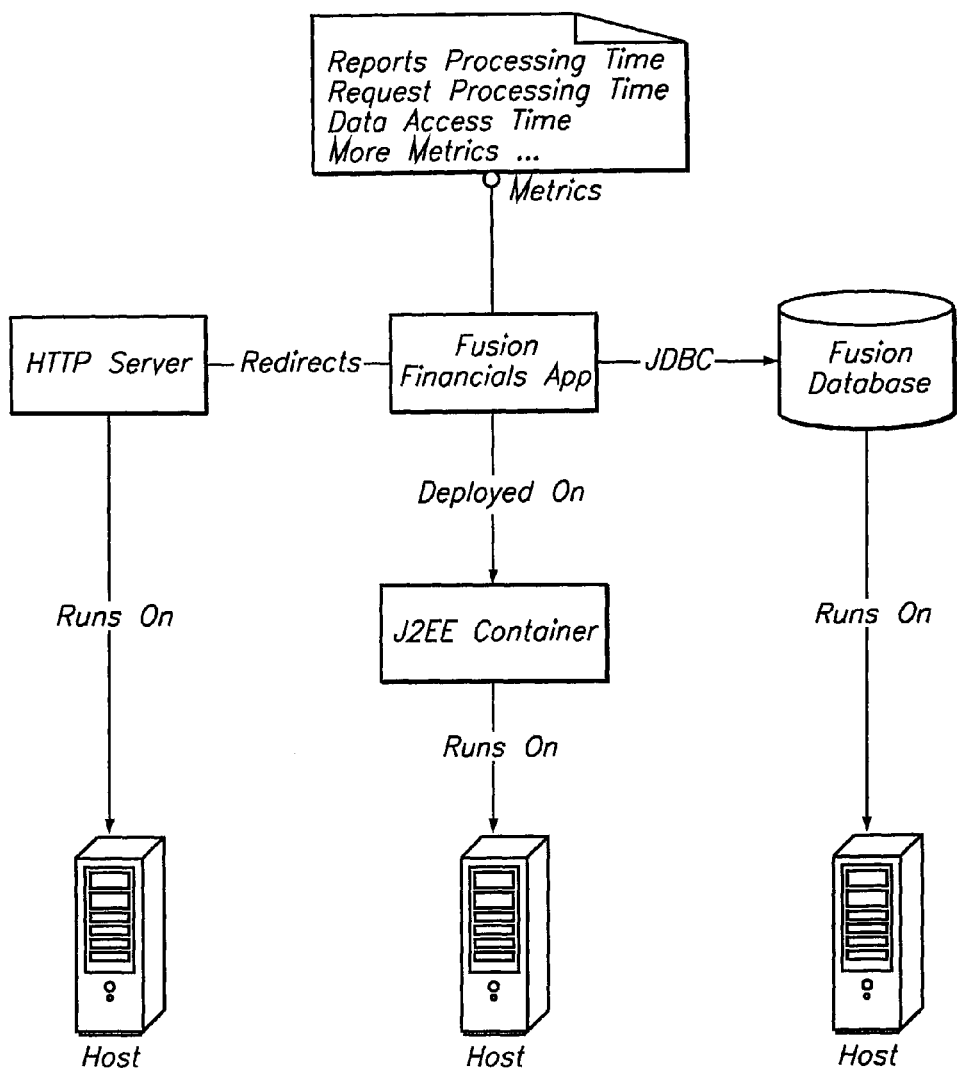
FIG. 5A is block diagram illustrating an example enterprise environment to which an exemplary no nesting metric dependency model is bound.

FIG. 5A is block diagram illustrating an example enterprise environment 200 to which the above no nesting metric dependency definition is bound by MEM system 201 according to an embodiment of the invention. As shown, in the exemplary enterprise environment 200, an instance of financials software application 303 is deployed on an instance of J2EE Container 303 which runs on a host instance 240. The instance of the financials software application 303 provides a set of metrics that include a "Reports Processing Time", a "Request Processing Time", and a "Data Access Time" metric. Metric data for those three metrics are made available to MEM system 201 as system component data 231 in management repository 230 as instances of the metric data class 403 named "ReportsProcessing", "RequestProcessing", and "DataAccess" respectively and associated with instances of the system component class 401 with a type attribute value set to "fusion_app_financials" to indicate the system component type.

According to one embodiment, to bind system components to a no nesting metric dependency definition, MEM system 210 searches system component data 231 for all instances of the system component class 401 that have a type attribute value that matches the source system component type specified in the definition. For example, upon obtaining a metric dependency model 210 containing the above no nesting metric dependency definition, MEM system 201 searches system component data 231 for system component class 401 instances having a type attribute value that matches the value of the TargetType attribute of the MetricDependency element. MEM system 201 binds all matching system component class 401 instances to the model 210. Once bound, MEM system 201 facilitates comparison by a user of the source metric to the related metrics for each of the bound system components. In particular, for each bound system component, MEM system 201 is capable of presenting a user interface displaying metric data for the source metric and the related metrics that is associated with the bound system component. The associated metric data for the bound system component is obtained by MEM system 201 from the instances of the metric data class 403 that are stored in association with the system component class 401 instance corresponding to the bound system component.

Figure 5B:
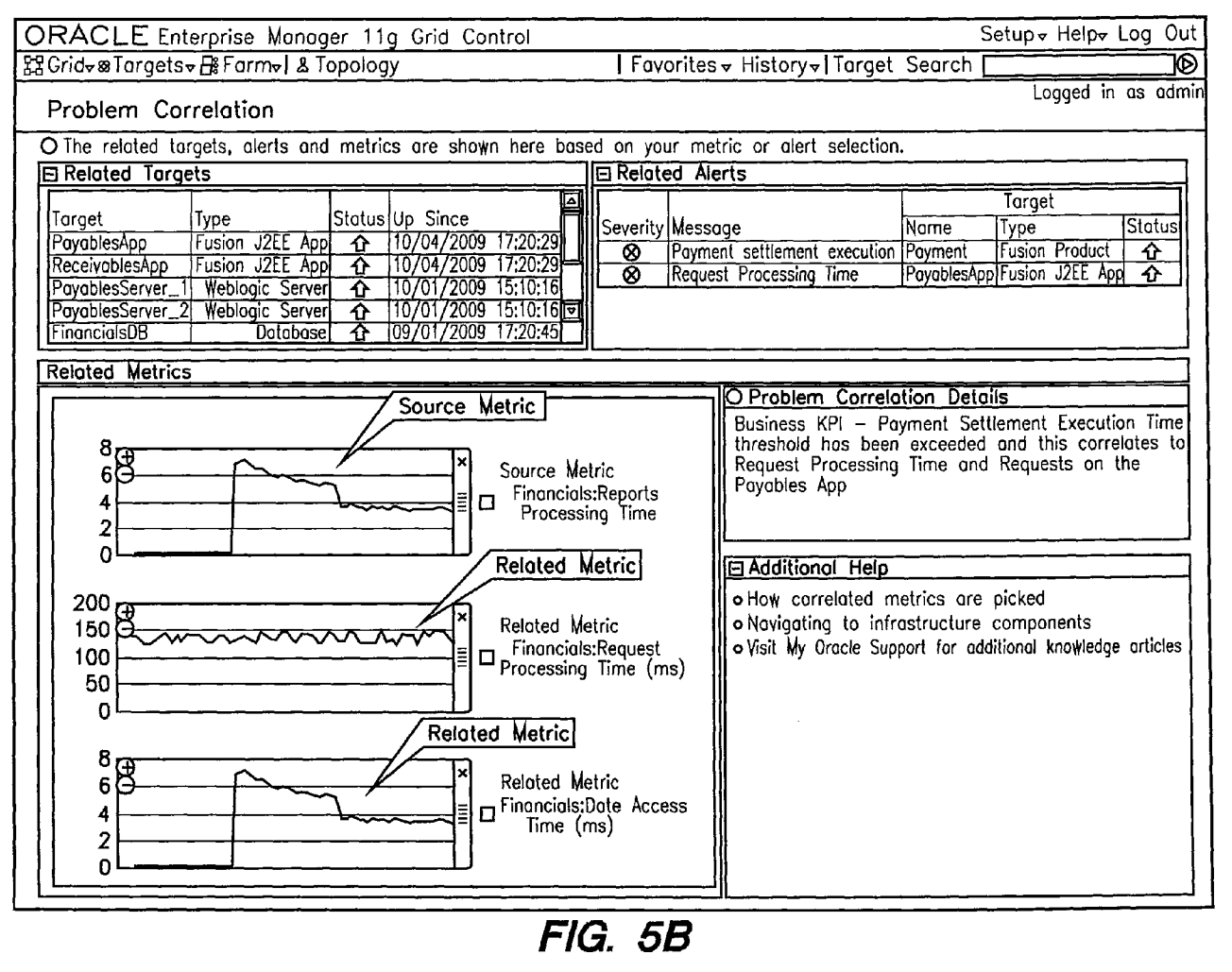

FIG. 5B is a screen shot of an example user interface provided by MEM system 201 for comparing an example source metric to an example related metrics, according to an embodiment of the invention. As shown, the user interface provides a chart of the source metric and the two related metric specified in the above no nesting metric dependency definition for a system component of type "fusion_app_financials". If, during the binding phase, MEM system 201 bound other system components of system component type "fusion_app_financials" to the metric dependency definition, then MEM system 201 provides a similar user interface for each of the other bound system components. The user interface shown in FIG. 5B provides a chart of the source metric "Reports Processing Time", a chart of the related metric "Request Processing Time", and a chart of the related metric "Data Access Time" based on metric data available in management repository 230 for the bound system component. Each chart graphs the metric over a period of time which can be any period of time suitable for comparing the metrics such as, for example, a historical snapshot window of time. The values of the MetricColumn attributes of the SourceMetric element and RelatedMetric elements specify the display units of the metrics. In particular, the "Reports Processing Time" metric is charted in second time units, the "Request Processing Time" metric is charted in millisecond time units, and the "Data Access Time" metric is charted in second time units. Thus, the MetricColumn element attribute can be used in the metric dependency model to control how MEM system 201 displays metric data to a user of MEM system 201.

In one embodiment, charts displayed by MEM system 201 are updated as metric data for the displayed metrics becomes available in management repository 230. For example, as metric data for a displayed metric becomes available it is charted on the right side of the corresponding chart while old metric data moves off the left side of the chart. In this way, the charts on the user interface provided by MEM system 201 allow a user to analyze metric dependencies in real-time and not just for historical snapshot windows of time.

The user interface of FIG. 5B, and in particular, the concurrent display of the charts of the source metric and the two related metrics, allows a user of MEM system 201 to readily determine that the source metric "Reports Processing Time" is strongly dependent on the "Data Access Time" metric and weakly dependent on the "Request Processing Time" metric. More generally, the metric dependency model can be used to model a dependency between any available metric and any other available metric. By virtue of MEM system's capability to chart modeled metric dependencies as shown by example in FIG. 5B, the MEM system 201 allows a user to readily determine the strength of dependencies between any available metric and any other available metric. This capability greatly aids the user in determining the probable cause of an undesirable trend or tendency in the source metric.

2.3.2 One-Level Nesting Metric Dependency

The foregoing example metric dependency definition is an example of a "no nesting" metric dependency definition in which the dependency between the source metric and related metrics is contained within a single system component instance. However, in some circumstances, it is desirable to establish a metric dependency between metrics that span more than one system component instance. For example, consider the following example of a "one-level nesting" metric dependency definition:

```
<MetricDependency TargetType="fusion_app_financials">
    <SourceMetric MetricName="ReportsProcessing"
    MetricColumn="Time.seconds" >
        <AssocTarget TargetType="weblogic_j2eeserver" >
            <RelatedMetric MetricName="RequestThroughput"
            MetricColumn="Count" />
            <RelatedMetric MetricName="BeanAccessTime"
            MetricColumn="Time.milliseconds"
    />
        </AssocTarget>
    </SourceMetric>
</MetricDependency>
```

By use of the associated target element as a child element of the source metric element, a user can indicate to MEM system 201 that the dependency between the source metric and related metrics spans more than one system component. For example, the above example metric dependency definition specifies that the "ReportsProcessing" source metric available for the "fusion_app_financials" type of system component depends on the "RequestThroughput" and the "BeanAccessTime" related metrics available from a different system component, in particular, the "weblogic_j2eeserver" type of system component as indicated by the TargetType attribute of the AssocTarget element. In the above example metric dependency, the target type "weblogic_j2eeserver" refers to Java 2 Enterprise Edition (J2EE) Enterprise Java Bean (EJB) container software part of the WebLogic Software Suite available from Oracle Corporation of Redwood Shores, Calif.

Figure 6A:
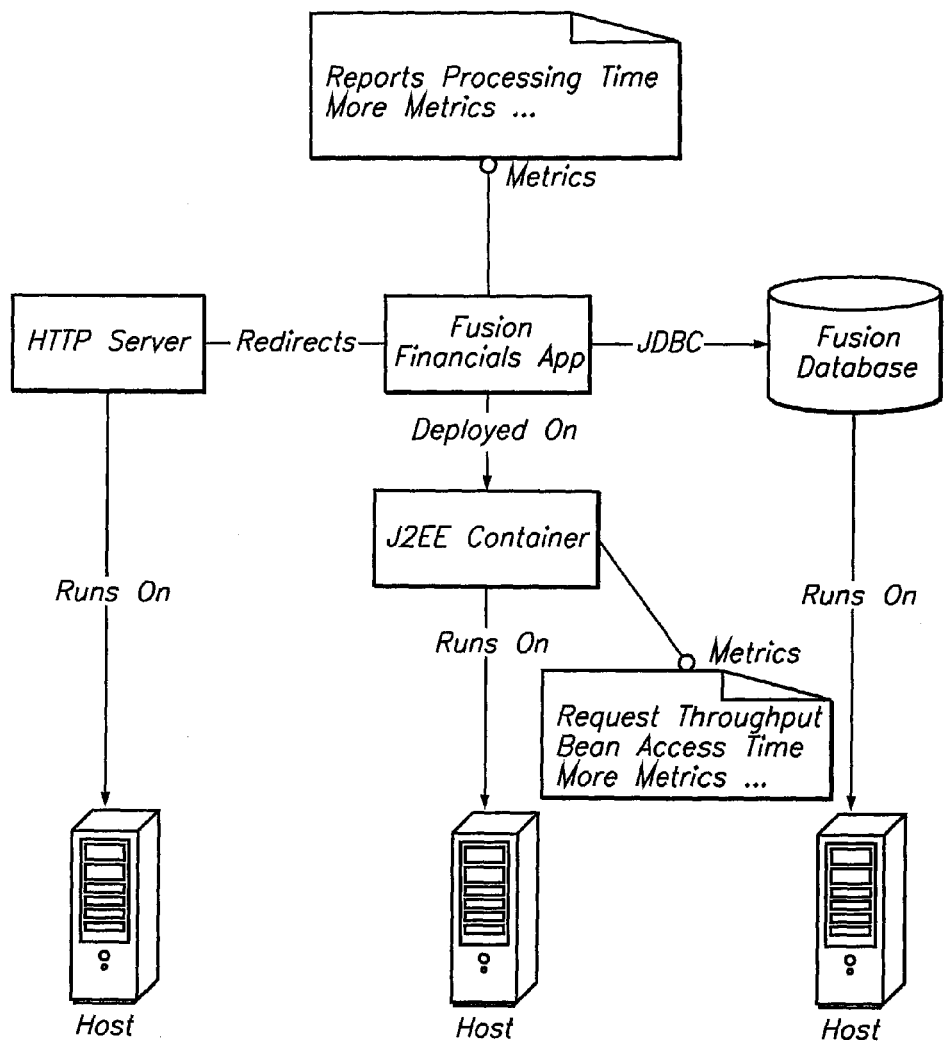
FIG. 6A is block diagram illustrating an example enterprise environment to which an exemplary one-level nesting metric dependency model is bound.

FIG. 6A is block diagram illustrating an example enterprise environment 200 to which the above one-level nesting metric dependency definition is bound by MEM system 201 according to an embodiment of the invention. In addition to the metrics available for the instance of the financials software application 303, the instance of the J2EE Container 303 provides a set of metrics that include a "Request Throughput" metric and a "Bean Access Time" metric. Metric data for the "Request Throughput" metric and the "Bean Access Time" metric are made available to MEM system 201 as system component data 231 in management repository 230 as metric data class 403 instances named "RequestThroughput" and "BeanAccessTime" respectively. Those metric data class 403 instances are associated in management repository 230 with system component class 401 instances having a type attribute value of "weblogic_j2eeserver".

According to one embodiment, to bind system component instances to a one-level nesting metric dependency definition, MEM system 201 searches system component data 231 for source system component instances that have a deployment relationship with the related system component instance. This search produces one or more sets of system component instances comprising a source system component instance and a related system component instance. MEM system 201 binds each set to the one-level nesting metric dependency definition such that metric correlation and analysis capabilities are provided by MEM system 201 for each bound set. For example, upon obtaining a metric dependency model 210 containing the above example one-level nesting metric dependency definition, MEM system 201 searches system component data 231 for system component instances of type "fusion_app_financials" that have a deployment relationship with a system component instance of type "weblogic_j2eeserver". MEM system 201 binds all such pairs of system component instances to model 210 and provides the ability to compare source metrics and related metrics for each pair.

Figure 6B:
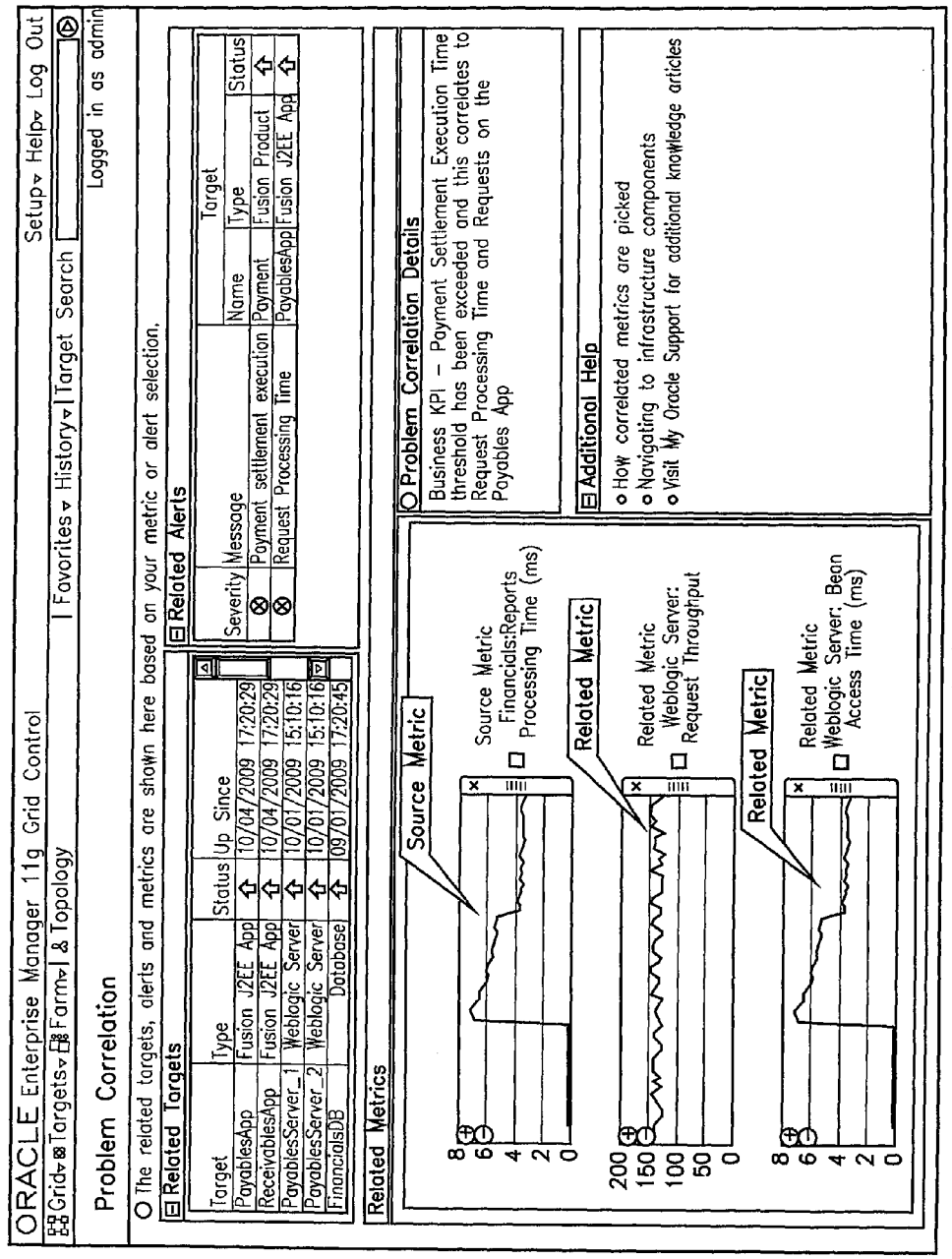
FIG. 6B is a screen shot of a user interface for analyzing metric data obtained from system components in the enterprise environment of FIG. 6A.

FIG. 6B is a screen shot of a user interface provided by MEM system 201 for comparing a source metric to a related metrics specified in an example one-level nesting metric dependency definition, according to an embodiment of the invention. As shown, the user interface provides a chart of the source metric and the two related metrics specified in the above one-level nesting metric dependency definition for a bound set of system component instances. If, during the binding phase, MEM system 201 had bound other sets of system component instances to the metric dependency definition, then MEM system 201 provides a similar user interface for each of the other bound sets.

2.3.3 One-Level Nesting Metric Dependency Through Associations

In addition to establishing a metric dependency between metrics that span more than one system component, in some circumstances, it is desirable to specify a particular deployment relationship between the source system component instance and the related system component instance. For example, consider the following example of a "one-level nesting" metric dependency definition that specifies a "Deployed On" deployment relationship:

```
<MetricDependency TargetType="fusion_app_financials" ver="1.0" >
    <SourceMetric MetricName="ReportsProcessing"
    MetricColumn="Time.seconds" >
        <AssocTarget TargetType="weblogic_j2eeserver"
        Association="Deployed On">
            <RelatedMetric MetricName="RequestThroughput"
            MetricColumn="Time.milliseconds"
    />
            <RelatedMetric MetricName="BeanAccessTime"
            MetricColumn="Time.milliseconds"
    />
        </AssocTarget>
    </SourceMetric>
</MetricDependency>
```

By specification of a deployment relationship in a one-level nesting metric dependency definition, a user can indicate to MEM system 201 that the specified source metric available for a source system component instance depends on one or more related metrics available for a related system component instance only if the source system component instance has the specified deployment relationship with the related system component instance. For example, the above metric dependency definition specifies to MEM system 201 that the source metric "ReportsProcessing" available for a system component instance of type "fusion_app_financials" depends on related metrics "RequestThroughput" and "BeanAccessTime" available for a system component instance of type "weblogic_j2eeserver" only if the instance of the "fusion_app_financials" is "Deployed On" on the instance of the "weblogic_j2eeserver". In one embodiment, MEM system 201 determines whether the source system component instance has the specified deployment relationship with the related system component instance by checking management repository 230 for the existence of a matching deployment relationship class 405 instance between the corresponding system component class 401 instances.

A deployment relationship refers broadly to any detectable relationship between two system components deployed in an enterprise network. The "Deployed On" deployment relationship is but one example of a deployment relationship and other deployment relationships may be specified in a metric dependency model 210 such as, for example, "Uses", "Runs On", "JDBC", "Connects", "Redirects", etc. In one embodiment, information about deployment relationships in an enterprise network is stored as instances of the deployment relationship class 405 in management repository 230. Information about deployment relationships in an enterprise network between system components can be obtained by any number of a variety of means including, but not limited to, from management agents installed on managed hosts 240 as discussed above with respect to FIG. 3.

2.3.4 Multi-Level Nesting Metric Dependency Through Associations

The one level nesting metric dependency definition can be generalized as a multi-level nesting metric dependency definition for cases where the metric dependency spans more than one system component. For example, consider the following example of a "multi-level nesting" metric dependency definition that includes various deployment associations:

available for a related system component instance of type "database" only if the source system component instance has a "Redirects" deployment relationship with a system component instance of type "fusion_app_financials" which in turn has a "Uses" deployment relationship with a system component instance of type "OID" which in turn has a "JDBC" deployment relationship with a system component instance of type "listener" which in turn has a "Connects" deployment relationship with the related system component instance.

According to one embodiment, MEM system 201 binds a set of system component instances comprising a source system component instance and a related system component instance if the set of system component instances satisfies any of the dependency chains specified in multi-level metric dependency definition. For example, given the above example multi-level metric dependency definition, a set of system component instances comprising a source system component instance of type "http_server" that has a "Redirects" deployment relationship with a related system component instance of type "fusion_app_financials" will be bound by MEM system 201 to the dependency chain for the "AuthenticationTime" related metric. A set of system component instances comprising a source system component instance of type "http_server" and a related system component instance of type "database" will be bound by MEM system 201 to the above example metric dependency definition if the dependency chain for the "SQLResponse" related metric is satisfied. Where one satisfied dependency chain is contain completely within another satisfied dependency chain, the separate sets of system component instances that satisfy the separate chains may be combined by MEM system

```
<MetricDependency TargetType="http_server">
    <SourceMetric MetricName="HTTP Authentication" MetricColumn="Time.seconds" >
        <AssocTarget TargetType="fusion_app_financials" Association="Redirects">
            <RelatedMetric MetricName="AuthenticationTime" MetricColumn="Time.seconds"
/>
            <AssocTarget TargetType="OID" Association="Uses">
                <AssocTarget TargetType="listener" Association="JDBC">
                    <AssocTarget TargetType="database" Association="Connects">
                        <RelatedMetric MetricName="SQLResponse" MetricColumn="Time.milliseconds"
/>
                    </AssocTarget>
                </AssocTarget>
            </AssocTarget>
        </AssocTarget>
    </SourceMetric>
</MetricDependency>
```

Figure 7A:
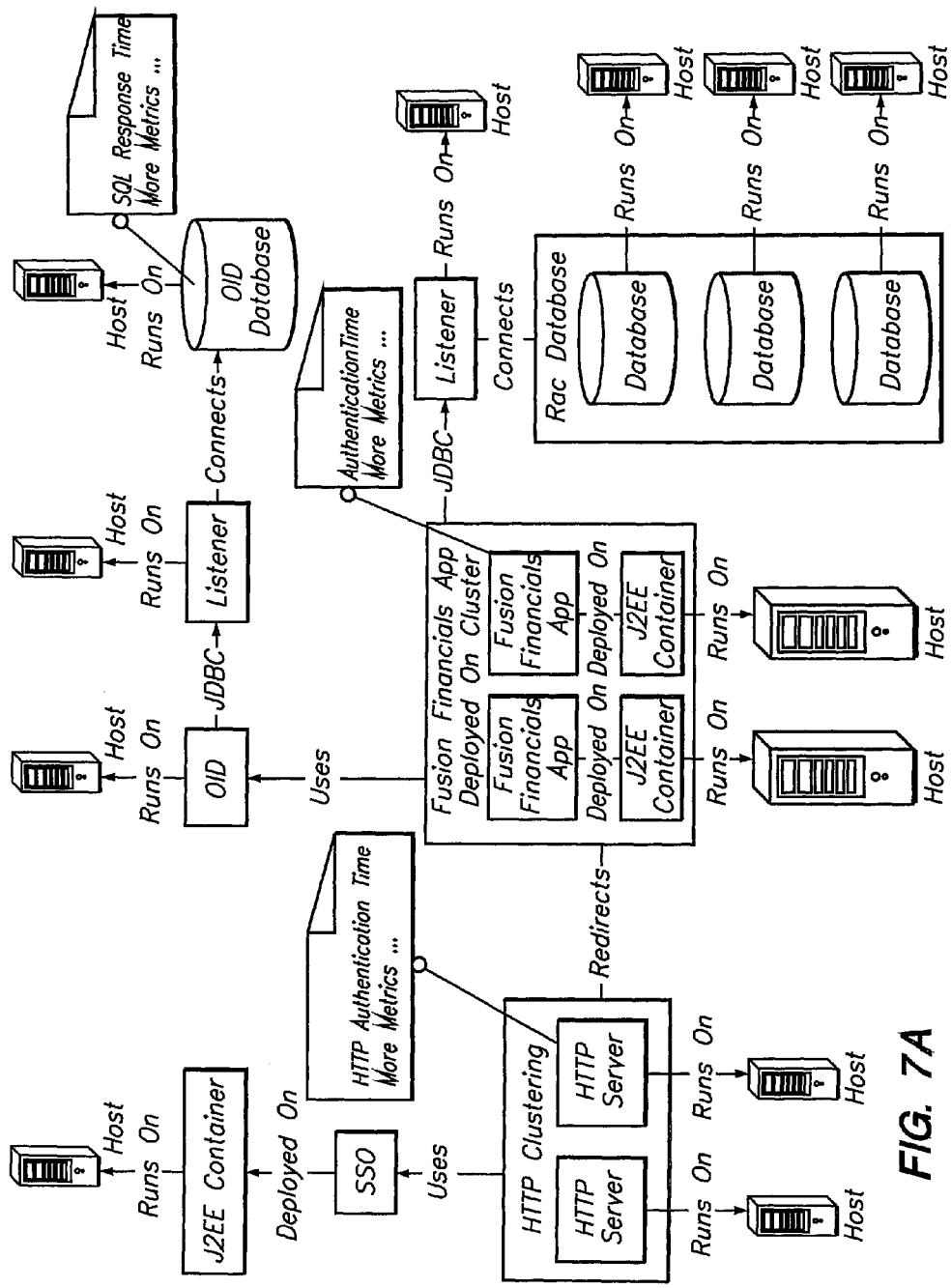
FIG. 7A is block diagram illustrating an example enterprise environment to which an exemplary multi-level nesting through associations metric dependency model is bound.
Figure 7B:
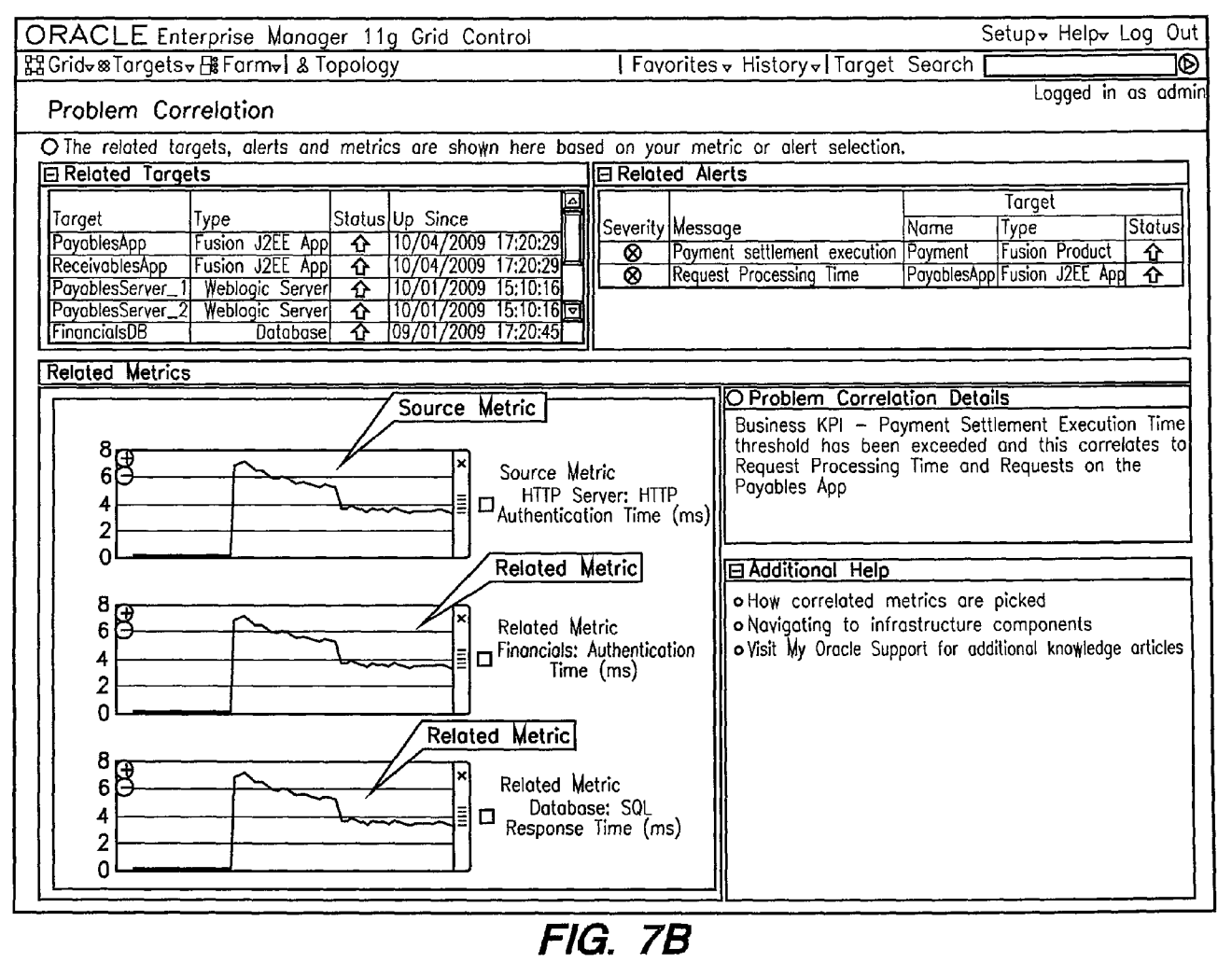

In a multi-level metric dependency, a source metric can depend on multiple related metrics where each metric dependency traverses a different chain of deployment relationships between system components. For example, in the above multi-level metric dependency definition, the source metric "HTTP Authentication" available for the "http_server" type of system component depends on two related metrics through two different chains of deployment relationships. In one chain, the definition specifies that the "HTTP Authentication" metric available for a source system component instance of type "http_server" depends on the "AuthenticationTime" metric available for a related system component instance of type "fusion_app_financials" only if the source system component instance has a "Redirects" deployment relationship with the related system component instance. In the other chain, the definition specifies that the "HTTP Authentication" metric available for a source system component instance of type "http_server" depends on the "SQLResponse" metric 201 into a single set of system component instances. For example, as shown in FIG. 7A, the "HTTP server" instance for which the "HTTP Authentication Time" metric is available, the "Fusion Financials App" instance for the "Authentication Time" metric is available, and the "SQL Response Time" metric is available satisfy both dependency chains specified in the above example multi-level metric dependency definition in which the chain for the "Authentication Time" metric is contained entirely within the "SQL Response Time" metric. Accordingly, in this case, MEM system 201 presents a single user interface for all three metrics as shown in FIG. 7B as opposed to a separate user interfaces for the "Authentication Time" metric and the "SQL Response Time" metric respectively.

2.3.5 System Component Clusters

In one embodiment, the TargetType attribute of the Metric Dependency element or the AssocTarget element refers to a cluster of system components. For example, the environment of FIG. 7A shows a cluster of HTTP servers, a cluster of database servers labeled "RAC Database", and a cluster Fusion Financials Applications. MEM system 201 treats system component clusters like other system components. Therefore, MEM system 201 is capable of binding system component clusters to a model 210 and capable of providing analysis of metrics available for a cluster of system components.

2.3.6 Configuration Metrics

In one embodiment, a related metric specified in a metric dependency model 210 refers to a configuration metric. A configuration metric measures the setting of a particular configuration parameter of a system component. In one embodiment, a configuration metric comprises one or more data samples representing the state of the particular configuration parameter at various points of time. An administrator can create a metric dependency model 210 to track a dependency between a source metric and a related configuration metric. When such a model 210 is provided to MEM system 201, MEM system 201 provides to the administrator the ability to analyze the strength of the dependency between the source metric and the related configuration metric. For example, MEM system 201 can present a user interface charting the source metric against the related configuration metric for historical snapshot period of time or, alternatively, for an ongoing period of time. Such charting can aid the administrator in determining whether a change in the performance of the source metric is related to a change to the configuration parameter represented by the related configuration metric.

2.3.7 Searching for Configuration Changes

Figure 8:
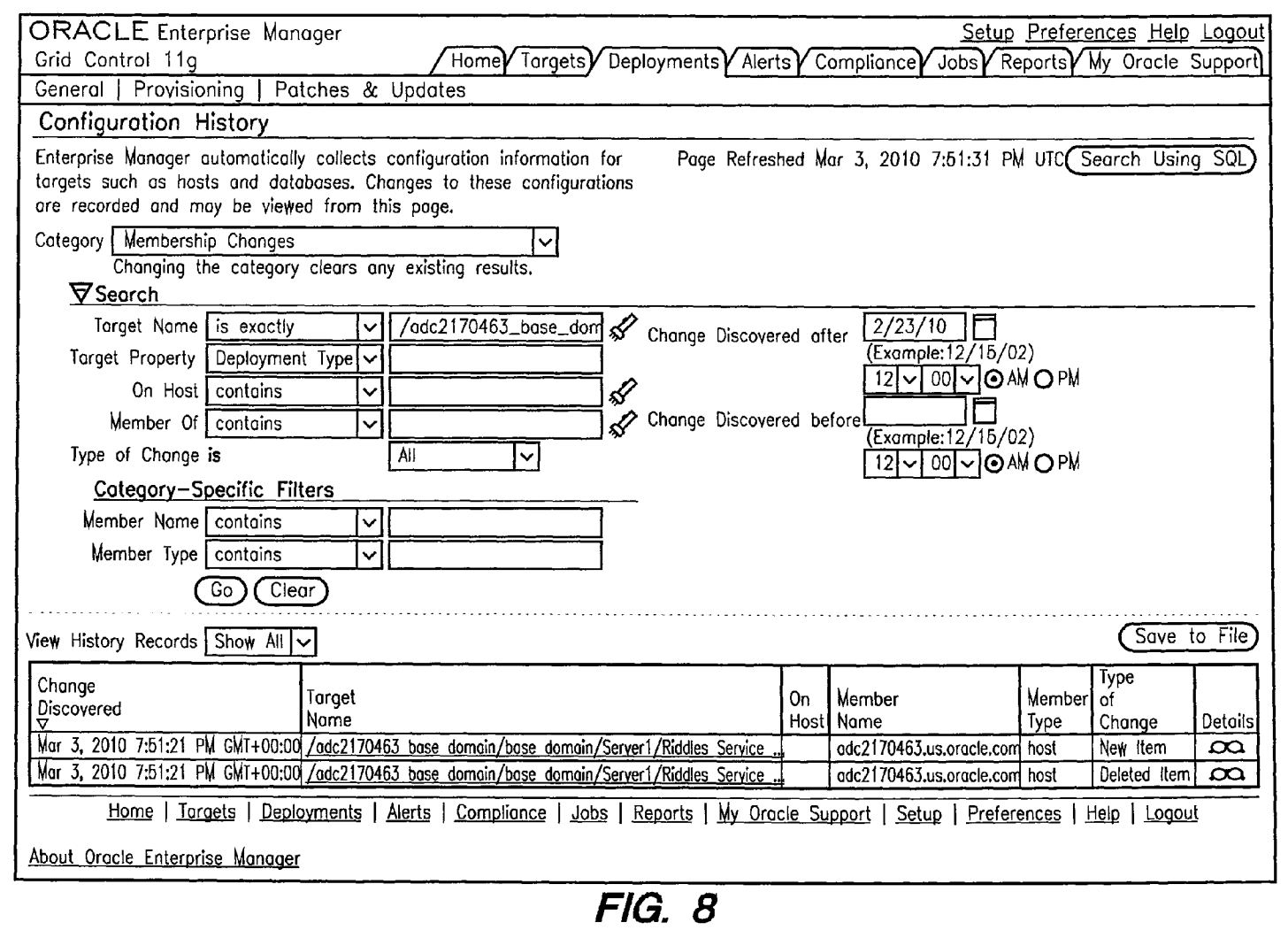

In one embodiment, MEM system 201 provides a user interface allowing a user 220 to search for configuration changes made to system components of managed hosts 240. For example, FIG. 8 is a screen shot of an example user interface 800 for searching for configuration changes. In area 801, one or more configuration change records are displayed as results of a search for configuration changes. Search results are displayed in a tabular format. Each row in the results table corresponds to a configuration change made to a particular system component instance. In one column of the table, a user can access detailed information about a corresponding configuration change. Area 803 allows a user to select the search criteria for searching for configuration changes. When providing search results in response to a configuration changes search request, MEM system 201 searches system component data 231 for configuration change records that satisfy criteria specified in the search request. As mentioned previously, system component data 231 may be populated with information about configuration changes made to system components of managed hosts 240 based on configuration data reported to MEM system 201 by management agents installed managed hosts 240 or based on data provided by other management systems.

3.0 Implementing Mechanics—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

4.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
   obtaining metric dependency model, the obtained model specifying (a) that a source metric of a plurality of available metrics is related to a first related metric of the plurality of available metrics, (b) a first type of system component from which the source metric is available, and (c) a second type of system component from which the first related metric is available;
   binding the metric dependency model to a particular networked system environment, the particular networked system environment comprising an instance of the first type of system component and an instance of the second type of system component;
   wherein binding the metric dependency model to the particular networked system environment comprises:
      identifying, in a management repository, based on the first type of system component specified in the model, the instance of the first type of system component,
      identifying, in the management repository, based on the second type of system component specified in the model, the instance of the second type of system component,
      obtaining, from the management repository, based on the source metric specified in the model and the identified instance of the first type of system component, first metric data corresponding to the source metric that was collected from the identified instance of the first type of system component, and
      obtaining, from the management repository, based on the first related metric specified in the model and the identified instance of the second type of system component, second metric data corresponding to the first related metric that was collected from the identified instance of the second type of system component; and
   causing concurrent display of the first metric data and the second metric data in a manner that facilitates visual comparison of the source metric to the first related metric;
   wherein the method is performed by one or more computing devices.

2. The method of claim 1, wherein the obtained metric dependency model further specifies (d) a first association between the first type of system component and the second type of system component, the method further comprising:
   based on the obtained metric dependency model, determining that the identified instance of the first type of system component is associated with the identified instance of the second type of system component as indicated by the first association.

3. The method of claim 2, wherein the obtained metric dependency model further specifies (e) that the source metric is related to a second related metric of the plurality of available metrics, (f) a third type of system component from which the second related metric is available, and (g) a second association between the second type of system component and the third type of system component, the method further comprising:
   based on the obtained metric dependency model, identifying, in the management repository, based on the third type of system component specified in the model, an instance of the third type of system component, determining that the identified instance of the second type of system component is associated with the identified instance of the third type of system component as indicated by the second association, and obtaining, from the management repository, based on the second related metric specified in the model and the identified instance of the third type of system component, third metric data corresponding to the second related metric that was collected from the identified instance of the third type of system component; and causing concurrent display of the first metric data, the second metric data, and the third metric data in a manner that facilitates visual comparison of the source metric to the first related metric and the second related metric.

4. The method of claim 2, wherein the first association indicates that the first type of system component is a different type of system component than the second type of system component.

5. The method of claim 2, wherein the first association specifies that the first type of system component is deployed on the second type of system component, the method further comprising:
based on the obtained metric dependency model, determining that the identified instance of the first type of system component is deployed on the identified instance of the second type of system component.

6. The method of claim 2, wherein the first association specifies that the first type of system component runs on the second type of system component, the method further comprising:
based on the obtained metric dependency model, determining that the identified instance of the first type of system component runs on the identified instance of the second type of system component.

7. The method of claim 2, wherein the first association specifies that the first type of system component redirects to the second type of system component, the method further comprising:
based on the obtained metric dependency model, determining that the identified instance of the first type of system component redirects to the identified instance of the second type of system component.

8. The method of claim 2, wherein the first association specifies that the first type of system component uses the second type of system component, the method further comprising:
based on the obtained metric dependency model, determining that the identified instance of the first type of system component uses the identified instance of the second type of system component.

9. The method of claim 2, wherein the first association specifies that the first type of system component connects to the second type of system component, the method further comprising:
based on the obtained metric dependency model, determining that the identified instance of the first type of system component connects to the identified instance of the second type of system component.

10. The method of claim 1, wherein the obtained metric dependency model is formatted in eXtensible Markup Language (XML) format.

11. The method of claim 1, wherein the first related metric is a configuration metric.

12. The method of claim 1, wherein identifying an instance of the first type of system component and identifying an instance of the second type of system component comprises searching the management repository for instances of the first type of system component and instances of the second type of system component, wherein the management repository stores information about instances of system components deployed in the particular networked system environment.

13. The method of claim 1, wherein the management repository stores metric data collected from instances of system components.

14. The method of claim 1, wherein at least one of the identified instance of the first type of system component and the identified instance of the second type of system component is an instance of a cluster of system components.

15. The method of claim 14, wherein obtaining first metric data and obtaining second metric data comprises obtaining metric data that was collected from the instance of the cluster of system components.

16. The method of claim 1, wherein causing concurrent display of the first metric data and the second metric data in a manner that facilitates visual comparison of the source metric to the first related metric comprises causing display on a graphical user interface of a chart of the first metric data and a chart of the second metric data.

17. A computer-readable storage medium storing instructions which, when executed by one or more computing devices, cause the one or more computing devices to perform a method comprising:
obtaining a metric dependency model, the obtained model specifying (a) that a source metric of a plurality of available metrics is related to a first related metric of the plurality of available metrics, (b) a first type of system component from which the source metric is available, and (c) a second type of system component from which the first related metric is available;
binding the metric dependency model to a particular networked system environment, the particular networked system environment comprising an instance of the first type of system component and an instance of the second type of system component;
wherein binding the metric dependency model to the particular networked system environment comprises:
identifying, in a management repository, based on the first type of system component specified in the model, the instance of the first type of system component,
identifying, in the management repository, based on the second type of system component specified in the model, the instance of the second type of system component,
obtaining, from the management repository, based on the source metric specified in the model and the identified instance of the first type of system component, first metric data corresponding to the source metric that was collected from the identified instance of the first type of system component, and
obtaining, from the management repository, based on the first related metric specified in the model and the identified instance of the second type of system component, second metric data corresponding to the first related metric that was collected from the identified instance of the second type of system component; and causing concurrent display of the first metric data and the second metric data in a manner that facilitates visual comparison of the source metric to the first related metric.

18. The computer-readable storage medium of claim 17, wherein the obtained metric dependency model further specifies (d) a first association between the first type of system component and the second type of system component, the method further comprising:
   based on the obtained metric dependency model, determining that the identified instance of the first type of system component is associated with the identified instance of the second type of system component as indicated by the first association.

19. The computer-readable storage medium of claim 18, wherein the obtained metric dependency model further specifies (e) that the source metric is related to a second related metric of the plurality of available metrics, (f) a third type of system component from which the second related metric is available, and (g) a second association between the second type of system component and the third type of system component, the method further comprising:
   based on the obtained metric dependency model,
      identifying, in the management repository, based on the third type of system component specified in the model, an instance of the third type of system component,
      determining that the identified instance of the second type of system component is associated with the identified instance of the third type of system component as indicated by the second association, and
      obtaining, from the management repository, based on the second related metric specified in the model and the identified instance of the third type of system component, third metric data corresponding to the second related metric that was collected from the identified instance of the third type of system component; and
   causing concurrent display of the first metric data, the second metric data, and the third metric data in a manner that facilitates visual comparison of the source metric to the first related metric and the second related metric.

20. The computer-readable storage medium of claim 18, wherein the first association indicates that the first type of system component is a different type of system component than the second type of system component.

21. The computer-readable storage medium of claim 18, wherein the first association specifies that the first type of system component is deployed on the second type of system component, the method further comprising:
   based on the obtained metric dependency model, determining that the identified instance of the first type of system component is deployed on the identified instance of the second type of system component.

22. The computer-readable storage medium of claim 18, wherein the first association specifies that the first type of system component runs on the second type of system component, the method further comprising:
   based on the obtained metric dependency model, determining that the identified instance of the first type of system component runs on the identified instance of the second type of system component.

23. The computer-readable storage medium of claim 18, wherein the first association specifies that the first type of system component redirects to the second type of system component, the method further comprising:
   based on the obtained metric dependency model, determining that the identified instance of the first type of system component redirects to the identified instance of the second type of system component.

24. The computer-readable storage medium of claim 18, wherein the first association specifies that the first type of system component uses the second type of system component, the method further comprising:
   based on the obtained metric dependency model, determining that the identified instance of the first type of system component uses the identified instance of the second type of system component.

25. The computer-readable storage medium of claim 18, wherein the first association specifies that the first type of system component connects to the second type of system component, the method further comprising:
   based on the obtained metric dependency model, determining that the identified instance of the first type of system component connects to the identified instance of the second type of system component.

26. The computer-readable storage medium of claim 17, wherein the obtained metric dependency model is formatted in eXtensible Markup Language (XML) format.

27. The computer-readable storage medium of claim 17, wherein the first related metric is a configuration metric.

28. The computer-readable storage medium of claim 17, wherein identifying an instance of the first type of system component and identifying an instance of the second type of system component comprises searching the management repository for instances of the first type of system component and instances of the second type of system component, wherein the management repository stores information about instances of system components deployed in the particular networked system environment.

29. The computer-readable storage medium of claim 17, wherein the management repository stores metric data collected from instances of system components.

30. The computer-readable storage medium of claim 17, wherein at least one of the identified instance of the first type of system component and the identified instance of the second type of system component is an instance of a cluster of system components.

31. The computer-readable storage medium of claim 30, wherein obtaining first metric data and obtaining second metric data comprises obtaining metric data that was collected from the instance of the cluster of system components.

32. The computer-readable storage medium of claim 17, wherein causing concurrent display of the first metric data and the second metric data in a manner that facilitates visual comparison of the source metric to the first related metric comprises causing display on a graphical user interface of a chart of the first metric data and a chart of the second metric data.

33. One or more computing devices comprising:
   one or more processors; and
   one or more computer-readable storage media storing instructions which, when executed by the one or more computing devices, cause the one or more computing devices to perform a method comprising:
   obtaining a metric dependency model, the obtained model specifying (a) that a source metric of a plurality of available metrics is related to a first related metric of the plurality of available metrics, (b) a first type of system component from which the source metric is available, and (c) a second type of system component from which the first related metric is available;

binding the metric dependency model to a particular networked system environment, the particular networked system environment comprising an instance of the first type of system component and an instance of the second type of system component;

wherein binding the metric dependency model to the particular networked system environment comprises:

identifying, in a management repository, based on the first type of system component specified in the model, the instance of the first type of system component, identifying, in the management repository, based on the second type of system component specified in the model, the instance of the second type of system component, obtaining, from the management repository, based on the source metric specified in the model and the identified instance of the first type of system component, first metric data corresponding to the source metric that was collected from the identified instance of the first type of system component, and obtaining, from the management repository, based on the first related metric specified in the model and the identified instance of the second type of system component, second metric data corresponding to the first related metric that was collected from the identified instance of the second type of system component; and causing concurrent display of the first metric data and the second metric data in a manner that facilitates visual comparison of the source metric to the first related metric.

34. The one or more computing devices of claim 33, wherein the obtained metric dependency model further specifies (d) a first association between the first type of system component and the second type of system component, the method further comprising:

based on the obtained metric dependency model, determining that the identified instance of the first type of system component is associated with the identified instance of the second type of system component as indicated by the first association.

35. The one or more computing devices of claim 34, wherein the obtained metric dependency model further specifies (e) that the source metric is related to a second related metric of the plurality of available metrics, (f) a third type of system component from which the second related metric is available, and (g) a second association between the second type of system component and the third type of system component, the method further comprising:

based on the obtained metric dependency model, identifying, in the management repository, based on the third type of system component specified in the model, an instance of the third type of system component, determining that the identified instance of the second type of system component is associated with the identified instance of the third type of system component as indicated by the second association, and obtaining, from the management repository, based on the second related metric specified in the model and the identified instance of the third type of system component, third metric data corresponding to the second related metric that was collected from the identified instance of the third type of system component; and causing concurrent display of the first metric data, the second metric data, and the third metric data in a manner that facilitates visual comparison of the source metric to the first related metric and the second related metric.

36. The one or more computing devices of claim 34, wherein the first association indicates that the first type of system component is a different type of system component than the second type of system component.

37. The one or more computing devices of claim 34, wherein the first association specifies that the first type of system component is deployed on the second type of system component, the method further comprising:

based on the obtained metric dependency model, determining that the identified instance of the first type of system component is deployed on the identified instance of the second type of system component.

38. The one or more computing devices of claim 34, wherein the first association specifies that the first type of system component runs on the second type of system component, the method further comprising:

based on the obtained metric dependency model, determining that the identified instance of the first type of system component runs on the identified instance of the second type of system component.

39. The one or more computing devices of claim 34, wherein the first association specifies that the first type of system component redirects to the second type of system component, the method further comprising:

based on the obtained metric dependency model, determining that the identified instance of the first type of system component redirects to the identified instance of the second type of system component.

40. The one or more computing devices of claim 34, wherein the first association specifies that the first type of system component uses the second type of system component, the method further comprising:

based on the obtained metric dependency model, determining that the identified instance of the first type of system component uses the identified instance of the second type of system component.

41. The one or more computing devices of claim 34, wherein the first association specifies that the first type of system component connects to the second type of system component, the method further comprising:

based on the obtained metric dependency model, determining that the identified instance of the first type of system component connects to the identified instance of the second type of system component.

42. The one or more computing devices of claim 33, wherein the obtained metric dependency model is formatted in eXtensible Markup Language (XML) format.

43. The one or more computing devices of claim 33, wherein the first related metric is a configuration metric.

44. The one or more computing devices of claim 33, wherein identifying an instance of the first type of system component and identifying an instance of the second type of system component comprises searching the management repository for instances of the first type of system component and instances of the second type of system component, wherein the management repository stores information about instances of system components deployed in the particular networked system environment.

45. The one or more computing devices of claim 33, wherein the management repository stores metric data collected from instances of system components.

46. The one or more computing devices of claim 33, wherein at least one of the identified instance of the first type of system component and the identified instance of the second type of system component is an instance of a cluster of system components.

47. The one or more computing devices of claim 46, wherein obtaining first metric data and obtaining second metric data comprises obtaining metric data that was collected from the instance of the cluster of system components.

48. The one or more computing devices of claim 33, wherein causing concurrent display of the first metric data and the second metric data in a manner that facilitates visual comparison of the source metric to the first related metric comprises causing display on a graphical user interface of a chart of the first metric data and a chart of the second metric data.

* * * * *

UNITED STATES PATENT AND TRADEMARK OFFICE
CERTIFICATE OF CORRECTION

PATENT NO.         : 8,229,953 B2                           Page 1 of 1
APPLICATION NO.    : 12/731743
DATED              : July 24, 2012
INVENTOR(S)        : Venkata Ramana Karpuram et al.

It is certified that error appears in the above-identified patent and that said Letters Patent is hereby corrected as shown below:

On the Title Page Item (75) Inventors:

Please delete "Venkata Ramana Kapuram" and insert --Venkata Ramana Karpuram--.

Signed and Sealed this
Second Day of October, 2012

David J. Kappos
*Director of the United States Patent and Trademark Office*

UNITED STATES PATENT AND TRADEMARK OFFICE
CERTIFICATE OF CORRECTION

PATENT NO. : 8,229,953 B2
APPLICATION NO. : 12/731743
DATED : July 24, 2012
INVENTOR(S) : Kapuram et al.

It is certified that error appears in the above-identified patent and that said Letters Patent is hereby corrected as shown below:

In the Drawing, sheet 11 of 12, delete fig 8, and substitute therefor the Drawing sheet, consisting of fig. 8, as shown on attached page.

In the Specification

In column 9, line 49, delete "Meteric" and insert -- Metric --, therefor.

In column 11, line 16, delete "Meteric" and insert -- Metric --, therefor.

In column 17, line 54, delete "Mechanics" and insert -- Mechanisms --, therefor.

Signed and Sealed this
First Day of October, 2013

Teresa Stanek Rea
*Deputy Director of the United States Patent and Trademark Office*

FIG. 8